United States Patent
Newton et al.

(10) Patent No.: US 8,150,354 B2
(45) Date of Patent: Apr. 3, 2012

(54) DETERMINING RELATIVE PHASE DATA OF A RECEIVED SIGNAL

(75) Inventors: Tim Newton, Bury (GB); Steven Singer, Cambridge (GB); Peter Brett, Witney (GB)

(73) Assignee: Cambridge Silicon Radio Limited, Cambridge (GB)

( * ) Notice: Subject to any disclaimer, the term of this patent is extended or adjusted under 35 U.S.C. 154(b) by 340 days.

(21) Appl. No.: 12/558,019

(22) Filed: Sep. 11, 2009

(65) Prior Publication Data
US 2010/0075603 A1    Mar. 25, 2010

(30) Foreign Application Priority Data
Sep. 12, 2008   (GB) .................................. 0816688.6

(51) Int. Cl.
*H04B 1/06*   (2006.01)
*H04K 3/00*   (2006.01)
(52) U.S. Cl. ..................... 455/277.1; 455/41.2; 375/347
(58) Field of Classification Search .................. 455/41.2, 455/272, 277.1–277.2; 375/347
See application file for complete search history.

(56) References Cited

U.S. PATENT DOCUMENTS
4,864,641 A  *  9/1989  Nakamura ................. 455/276.1
5,241,701 A  *  8/1993  Andoh .......................... 455/272
* cited by examiner

*Primary Examiner* — Lee Nguyen
(74) *Attorney, Agent, or Firm* — Marshall, Gerstein & Borun LLP

(57) ABSTRACT

A method of determining relative phase data of a signal received at multiple antennas, the signal being a phase-modulated data signal having a plurality of periods of constant frequency, the method comprising: within each period of constant frequency, sampling the signal received by a first one of the multiple antennas and sampling the signal received by at least one different one of the multiple antennas; determining from the received samples a data symbol value represented by the received signal for each of the periods of constant frequency; and using the determined data symbol value information to eliminate phase variations between the samples received by the different antennas within each constant frequency period arising from the modulation of the data signal to generate relative phase data for said different antennas.

13 Claims, 3 Drawing Sheets

DETERMINING RELATIVE PHASE DATA OF A RECEIVED SIGNAL

BACKGROUND

1. Field of the Disclosure

The disclosure generally relates to a method of collecting RDF data using Bluetooth™ signals that is suitable for implementation within a mobile device.

2. Related Technology

Radio direction finding (RDF) is a method of determining from received radio signals the direction in which the radio transmitter lies. A common method of performing RDF is to configure an array of antennas to receive the signals and determine the direction of the transmitter using the differences in phase and amplitude in the signals received at each antenna in the array. As input for the direction finding algorithms it is generally necessary to provide the relative phase and amplitude data for the received signal at each of the antennas within the array at a single given instant in time. This may be achieved by providing a separate receiver chain for each antenna so that the receivers can be sampled simultaneously (in parallel) or by switching between the individual antennas at a rate such that all the antennas can be sampled before the transmitted signal changes.

As mobile telephones, as well as other mobile devices, move towards becoming ubiquitous devices there is a desire to provide RDF capability within such mobile devices. It is already very common for such mobile devices to include a Bluetooth™ transceiver, which allows relatively short range (typically tens of meters) data communication to occur between Bluetooth™ enabled devices. There is therefore a desire to use Bluetooth™ transmissions in RDF within mobile devices. However, it is prohibitively expensive in terms of cost and physical space to provide a mobile device having a plurality of Bluetooth™ antennas each with their own receiver chain. Additionally, transmission rate for a Bluetooth™ signal is 1M symbols/s, with the symbols being transmitted using a frequency shift keying (FSK) scheme. It is not feasible To provide an array of antennas within a mobile device with the necessary switching speed to allow the antennas to be switched within a single symbol period.

SUMMARY

According to a first aspect, there is provided a method of determining relative phase data of a signal received at multiple antennas, the signal being a phase-modulated data signal having a plurality of periods of constant frequency, the method including within each period of constant frequency, sampling the signal received by a first one of the multiple antennas and sampling the signal received by at least one different one of the multiple antennas, determining from the received samples a data symbol value represented by the received signal for each of the periods of constant frequency and using the determined data symbol value information to eliminate phase variations between the samples received by the different antennas within each constant frequency period arising from the modulation of the data signal to generate relative phase data for said different antennas.

The step of determining the data symbol values may include identifying periods of constant frequency corresponding to periods within the data signal having known data symbol values Additionally, or alternatively, the step of determining the data symbol values may include determining one or more data symbol values from one or more previously determined data symbol values according to prior knowledge of the data signal content.

The method may further include initially sampling the signal received by the first antenna at least twice within a single period of constant frequency and from signal samples determining the frequency deviation of the modulated data signal.

The data signal may include a known data code marking the beginning of the plurality of periods of constant frequency and the method may include identifying receipt of the known data code by an antenna and commencing the remainder of the method in response to identifying receipt of the known data code.

The data signal may comprise a Bluetooth™ signal.

According to another aspect, there is provided an apparatus for receiving a phase-modulated data signal including a plurality of periods of constant frequency, the apparatus including a plurality of antennas, each antenna arranged to receive the data signal and each antenna being spatially separated from one another, a signal receive chain arranged to receive as an input the data signal received at any one of the plurality of antennas and generate a sample of said signal, and a signal switch arranged to selectively connect any one of the plurality of antennas to the signal receive chain, wherein the apparatus is arranged to sample the signal received by a first one of the antennas and subsequently sample the signal received by at least one different one of the antennas within each period of constant frequency.

The apparatus may be further arranged to initially sample the signal received by the first antenna at least twice within a single period of constant frequency.

The apparatus may further include a further antenna arranged to continuously receive the data signal and a further receive chain connected to the further antenna arranged to detect a data code within the data signal indicative of the beginning of a period of constant frequency and arranged to provide a control signal to the signal switch to commence connecting the plurality of antennas to the first receive chain.

Additionally the further antenna may comprise one of the plurality of antennas. Similarly, the further receive chain may comprise the previously referred to signal receive chain.

The antennas and receive chain may be arranged to receive Bluetooth™ radio signals.

According to a further aspect, there is provided a mobile device including apparatus according to the second aspect above and arranged to perform the method of the first aspect above.

BRIEF DESCRIPTION OF THE DRAWINGS

Embodiments of the present invention will now be described, by way of illustrative and non-limiting example only, with reference to the accompanying figures, of which.

DETAILED DESCRIPTION

Figure 1:
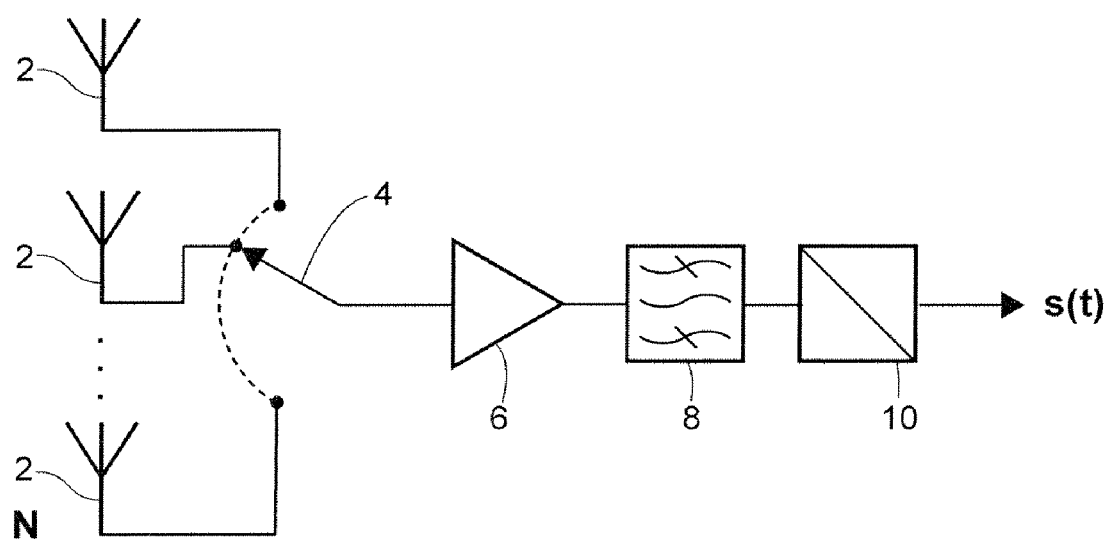
FIG. 1 schematically illustrates a suitable hardware arrangement according to an embodiment.

FIG. 1 schematically illustrates a suitable hardware arrangement for use in embodiments of the present invention. An array of N antennas 2 is provided, each antenna being suitable to receive a radio frequency signal, such as a Bluetooth™ signal. Each antenna 2 can be sequentially connected by means of a radio frequency switch 4 to a signal receive chain, the received chain including an amplifier arranged to receive the radio frequency signal from the connected antenna provide an output to a filter 8, the output of the filter being sampled by a sampler 10 to generate a sampled signal s(t).

The desired input for radio direction finding algorithms to be extracted from the sample signal s(t) are the cross-correlation coefficients between separate antennas 2 in the antenna array. This requires the phase and magnitude of the sampled signal at each antenna relative to a reference antenna. In embodiments of the present invention the received radio signal will be phase or frequency modulated, with a symbol rate such that it is not practical to operate the radio frequency switch 4 at such a rate to allow a single symbol to be sampled at each of the antennas 2 in the array. Consequently, between samples received at different antennas within the array there will be a change in phase and magnitude that arises from one of two sources: the difference between antenna (wanted) and change in the modulated signal (unwanted). This can be explained more clearly with reference to FIGS. 2-4.

Figure 2:
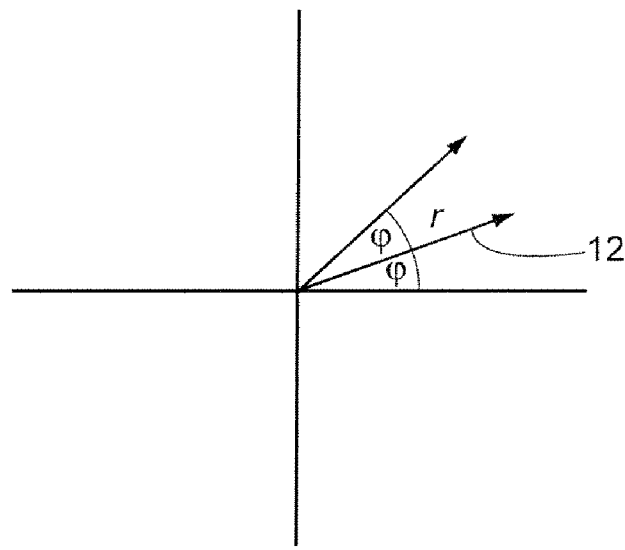
FIG. 2 is an Argand diagram representing a received signal.
Figure 3:
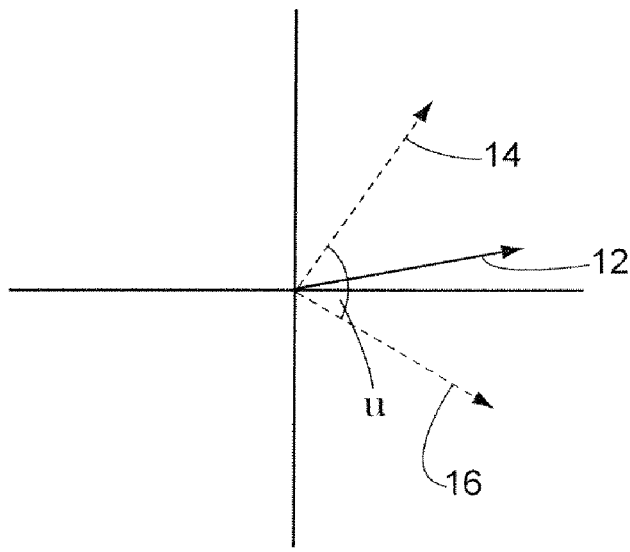
FIG. 3 is an Argand diagram representing a frequency modulated signal.
Figure 4:
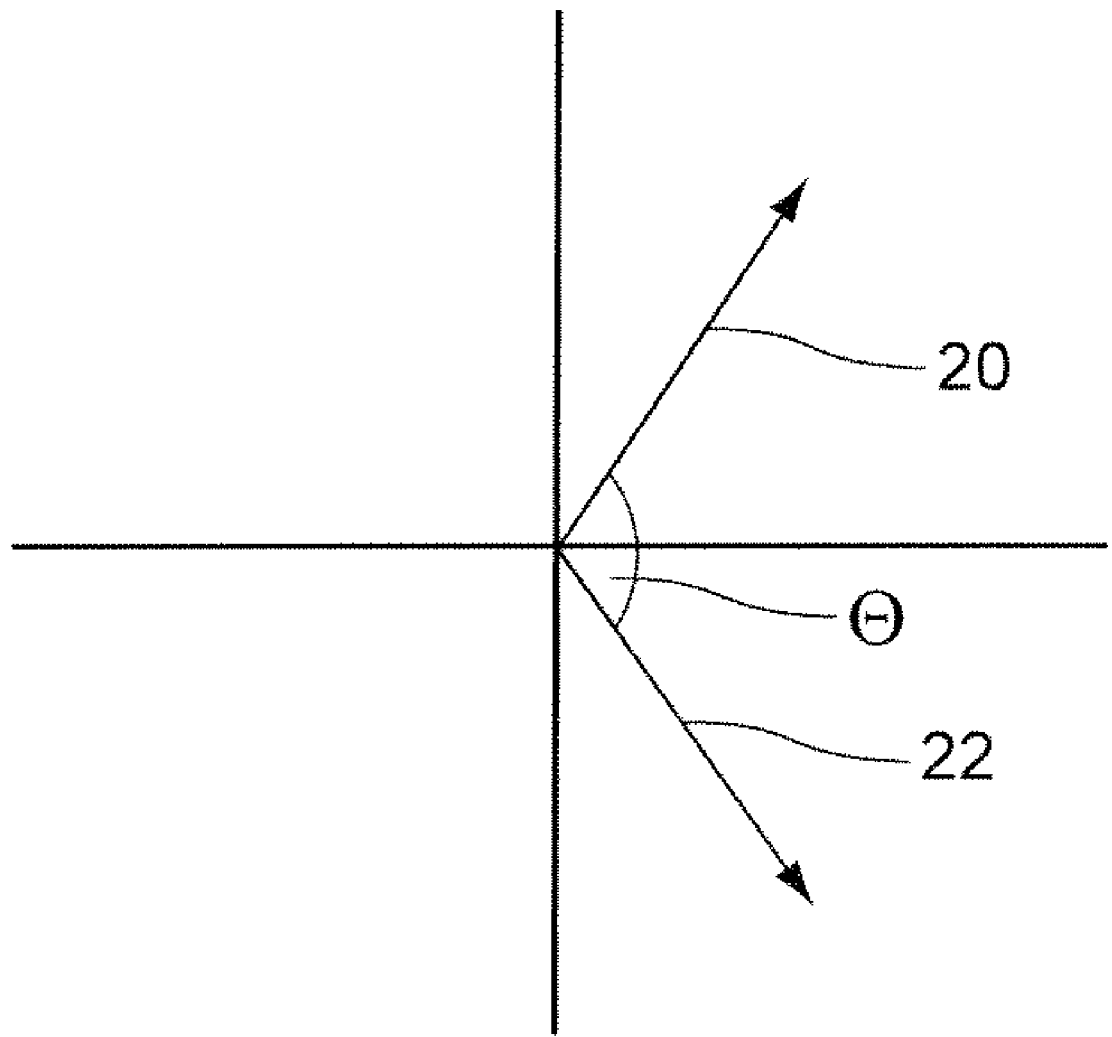
FIG. 4 is an Argand diagram representing a pair of received frequency modulated signals.

FIG. 2 is a representation of a received sample on an Argand diagram. A received signal sample is represented as a vector arrow 12, the length of which r represents the amplitude of the received signal, termed the absolute value of the signal sample. The angle φ between the line vector 12 and the horizontal axis of the Argand diagram is termed the argument (arg) of the signal, which is also the phase of the received signal. A signal with a constant magnitude and frequency, such as a modulation carrier signal, when sampled at equal time intervals can be represented on an Argand diagram by a sequence of vector arrows spaced apart by a constant phase difference φ. The rate of change of phase with time dφ/dt is termed the angular frequency ω, with ω=2πf, where f is the frequency of the signal. In mathematical terms the sample signal s(t) equals $(r)e^{j\phi}$ (for real and positive values of r). FIG. 3 schematically represents how the unmodulated signal 12 would be represented on the Argand diagram when modulated using frequency shift keying, in which the carrier frequency is either increased or decreased by a given frequency deviation to represent separate symbol values, such as 1 and −1. If an un-modulated signal was sampled at a first instant in time, represented by the solid arrow 12, and then the same signal was subsequently modulated using FSK and was sampled at a unit time period t later, then the second sample would be represented by either dashed arrow 14 if the symbol represented was a 1 or dashed arrow 16 if the symbol represented was −1. The angle u between the solid arrow and each of the dashed arrows represents the phase difference per unit time of the frequency modulation scheme, referred to as the frequency deviation. FIGS. 2 and 3 represent signals received at a single antenna. In embodiments of the present invention the separate signals of interest will be received at separate antennas. This may be represented on an Argand diagram as shown in FIG. 4, where two separate vector arrows 20, 22 are represented with a phase difference of θ being shown. The phase difference θ between the separate signals 20, 22 will be a combination of the phase difference due to the angular frequency of the transmitted signal, since the two signals are sampled at separate times, the possible phase difference arising from a difference in distance between the signal source and the respective antennas, and a possible phase difference arising from the frequency deviation if the symbol represented by the two separate signals differs from one another. Consequently, it is necessary in embodiments of the present invention to be able to determine each of these factors.

The symbol values represented by received signal frequencies are determined by utilizing runs of repeated ones or zeroes in the received signal, since during these runs the signal has approximately constant frequency. In embodiments of the present invention intended for use in a Bluetooth™ system advantage is taken from the fact that it is known that each packet header within a Bluetooth™ signal contains such repeated symbols, since the Bluetooth™ specification requires that each symbol within the packet header is repeated three times, i.e. a ⅓-rate FEC (forward error correction) is specified. The symbol value can therefore be determined as follows.

Consider a signal x(t) having constant unit magnitude and constant angular frequency ω, with phase at t=0 of p:

$$x(t)=\exp(j\times(\omega t+p))$$

the signal x(t) as expressed above represents the unmodulated carrier signal. Now let x(t) be modulated by a data sequence a(t) (where a takes the values of −1 or +1, corresponding to bit values of '1' and '0' respectively) and let A(t) be the integral of a(t) from t=0 to t=t. If the modulation technique applied is frequency shift keying (as in Bluetooth™) then there will be an angular frequency deviation u. The modulated signal y(t) is therefore given as:

$$y(t)=x(t)\times\exp(j\times uA(t))$$

$$=\exp(j\times(\omega t+uA(t)+p))$$

Now consider two separate antennas both arranged to receive the modulated signal y(t). The data sequence a(t), angular frequency ω and angular frequency deviation u are the same for the signals received at both antennas. However, the phase of the signals received at t=0 may be different and are denoted p1 and p2. It will be assumed that both received signals have the same unit magnitude. We denote the signal y(t) received at the first antenna at t=0 as y1(t) and the signal received at the second antenna at a separate time instance of t=T as y2(t). Hence:

$$y1(0)=s1=\exp(j\times p1)$$

$$y2(T)=s2=\exp(j\times \omega T+uA(t)+p2))$$

The phase difference between the signals received at the first and second antennas is given by the argument, arg, of s2/s1:

$$arg(s2/s1)=\omega T+uA(T)+(p2-p1)$$

We wish to find (p2−p1), since this is the phase difference of the received signals between the two antennas due solely to the difference in location of the antennas with respect to the transmitted signal. However, in addition to not knowing the values of p1 and p2 the values of u and a(t) are also unknown. To remove the effect of the (known) carrier frequency ω the received signal at each antenna can be mixed down to baseband before sampling, so in effect ω=0. Additionally, if the signals received at both antennas represent the same symbol then A(t)=T×a(t). Finally, if in fact we sample the two received signals twice at the same antenna then p2=p1. Consequently arg(s2/s1) can now be expressed as:

$$arg(s2/s1)=uA(t)+p1-p1=uTa(t)$$

Therefore the absolute value (magnitude) of the received signals is:

$$abs(arg)s2/s1))=uT$$

As T is known the angular frequency deviation u can therefore be determined. This just leaves the symbol value a(t) to be found.

In embodiments of the present invention to be used where the radio signals are transmitted using the Bluetooth™ protocol, use is made of the fact that within the header packet each symbol is transmitted three times per bit. The RF switch 4 (referring to FIG. 1) it is therefore arranged to switch between a pair of antennas within the time period during which the three symbols are transmitted. Each header packet is prefixed by an access code. Consequently, to determine when each header is about to commence the access code is received on a signal antenna and provides a "start" signal for the main received process. The single antenna may be one of the antennas within the antenna array or may be a separate dedicated Bluetooth™ antenna within the mobile device. Equally, the single antenna may be connected to the same receive chain to which the antenna array is connected or may be connected to an additional receive chain. On receiving the access code and corresponding start signal, the RF switch 4 connects one of the antennas 2 within the array, the antenna being denoted a reference antenna, and two samples are taken from the reference antenna during the transmission of the initial three (identical) symbols. From the explanation above, this represents the case where p2=p1 and therefore allows the frequency deviation u of the transmitted signal to be found. Subsequently, for each further three symbol transmission a sample is taken from the reference antenna and one of the remaining antennas, such that each antenna is paired with the reference antenna in turn. It will be appreciated that the order in which each pair of antennas is sampled may differ from one embodiment to another provided that each possible antenna pair (reference antenna plus another antenna in the array) is used. This is repeated until all the bits from the header packet have been received.

Once all the bits have been received they can be represented as individual vectors on an Argand diagram. However, it is still necessary to identify which vectors represent each symbol value. To identify each of the received symbols use is made of one or more of three properties of the packet header:

1. Some parts of the header are either known (i.e. they are dictated by the transmission protocol) or are known to be consistent from one header packet to another. For example, referring to Table 2 below, bits 1-4 are known.

2. Once one of the symbol values has been determined it is then possible to identify the remaining symbols received at the same antenna pairing. For example, referring again to table 2, all the samples from antenna pair (1,4) will plot to substantially the same location on the Argand diagram and therefore must be the same symbol value. As the bit value for bit 4 is known to be a '0' the remaining bits (bits 8, 12 & 16) must also be a '0'.

3. If at least one '1' and one '0' are seen on the same antenna pairing, it identifies all the symbols from that pairing, since the angular frequency deviation u is determined from the first symbol. For example, with reference to Table 2 below, the four samples from antenna pair (1,5) will be equally located on the Argand diagram in two separate locations, thus denoting that the samples in one location represent one bit value and the samples in the other location the other bit value. None of the bit values are already known for that antenna pair but as the angular frequency deviation u is known then it will be possible to determine the bit value associated with each sample location to be consistent with the known value of u.

Further knowledge of the header packet may also be used to calculate the symbol values once a sufficient number of the header symbols have been determined. For example, within the Bluetooth™ header the last eight bits represent a checksum derived from the first ten bits of the header. Consequently, once the symbol values for a certain number of bits within the header have been identified the checksum may be used to find the remainder by brute calculation force. Alternatively, the checksum may be used to validate the extracted symbol sequence.

An example array pairing pattern according to an embodiment of the present invention is illustrated below in table 1.

TABLE 1

| Antenna Pairing | Bit Nos. | | | | | | | | | | Checksum | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| (1, 1) | X | | | | | | | | | | | | | | | | | |
| (1, 2) | | X | | | | X | | | | X | | | | X | | | | X |
| (1, 3) | | | X | | | | X | | | | X | | | | X | | | |
| (1, 4) | | | | X | | | | X | | | | X | | | | X | | |
| (1, 5) | | | | | X | | | | X | | | | X | | | | X | |

In the above example the antenna array comprises five individual antennas, with antenna 1 being the reference antenna. As previously noted, the order of switching between antenna pairs may vary from embodiment to embodiment. Table 2 below provides an example of the extracted header symbols from the antenna pairing patent illustrated in Table 1.

TABLE 2

| Atenna Pairing | Bit Nos. | | | | | | | | | | Checksum | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| (1, 1) | 1 | | | | | | | | | | | | | | | | | |
| (1, 2) | | 0 | | | | 1 | | | | 0 | | | | 1 | | | | 0 |
| (1, 3) | | | 1 | | | | 1 | | | | 1 | | | | 1 | | | |
| (1, 4) | | | | 0 | | | | 0 | | | | 0 | | | | 0 | | |
| (1, 5) | | | | | ▓ | | | | ▓ | | | | ▓ | | | | ▓ | |

The bits shown in bold (bit numbers 1-4) are bits whose symbol value is already known, i.e. the symbol values are predefined by the header protocol. The remaining bits are those whose symbol value has been determined from the bit values already known, whilst the bits indicated in the shaded boxes are those whose symbol values have been found from having both a '0' and '1' on the same antenna pairing.

Having extracted the symbol values for each of the bits received at each antenna pair the required relative phase and amplitude information can be determined and consequently used to generate the known cross-correlation coefficients between the multiple antennas for use in conventional radio direction finding algorithms.

Whilst reference has been made above to Bluetooth™ radio signals in relation to embodiments of the present invention, it will of course be appreciated that any other transmission protocol containing periods of repeated symbol values may equally be utilised by embodiments of the present invention. Equally, other modulation schemes, such as QPSK or QAM, may also be used with embodiments of the present invention.

Advantages of the present invention include the fact that only one sample per antenna is required during each constant-frequency period, thus allowing a shorter constant-frequency period intervals to be utilised. Additionally, no prior knowledge of the symbol sequence is required, although any such knowledge can be exploited. Since no prior knowledge of the symbol sequence is required it is not necessary for there to be any cooperation or interaction between the mobile device in which the antennas are located and the target device transmitting the received signals stop furthermore, only a single RF receive chain is required to service the full antenna array, thus minimising the space and power requirements for the mobile device.

The invention claimed is:

1. A method of determining relative phase data of a signal received at multiple antennas, the signal being a phase-modulated data signal having a plurality of periods of constant frequency, the method comprising: within each period of constant frequency, sampling the signal received by a first one of the multiple antennas and sampling the signal received by at least one different one of the multiple antennas; determining from the received samples a data symbol value represented by the received signal for each of the periods of constant frequency; and using the determined data symbol value information to eliminate phase variations between the samples received by the different antennas within each constant frequency period arising from the modulation of the data signal to generate relative phase data for said different antennas.

2. The method of claim 1, wherein the step of determining the data symbol values includes identifying periods of constant frequency corresponding to periods within the data signal having known data signal having known data symbol values.

3. The method of claim 1, wherein the step of determining the data symbol values includes determining one or more data symbol values from one or more previously determined data symbol values according to prior knowledge of the data signal content.

4. The method of claim 1, further comprising initially sampling the signal received by the first antenna at least twice within a single period of constant frequency and from signal samples determining the frequency deviation of the modulated data signal.

5. The method of claim 1, wherein the data signal includes a known data code marking the beginning of the plurality of periods of constant frequency and the method includes identifying receipt of the known data code by an antenna and commencing the remainder of the method in response to identifying receipt of the known data code.

6. The method of claim 1, wherein the data signal comprises a Bluetooth™ signal.

7. Apparatus for receiving a phase-modulated data signal including a plurality of periods of constant frequency, the apparatus comprising:
a plurality of antennas, each antenna arranged to receive the data signal and each antenna being spatially separated from one another;
a signal receive chain arranged to receive as an input the data signal received at any one of the plurality of antennas and generate a sample of said signal; and
a signal switch arranged to selectively connect any one of the plurality of antennas to the signal receive chain,
wherein the apparatus is arranged to sample the signal received by a first one of the antennas and subsequently sample the signal received by at least one different one of the antennas within each period of constant frequency, determining from the received samples a data symbol value represented by the received signal for each of the periods of constant frequency; and using the determined data symbol value information to eliminate phase variations between the samples received by the different antennas within each constant frequency period arising from the modulation of the data signal to generate relative phase data for said different antennas.

8. The apparatus of claim 7 further arranged to initially sample the signal received by the first antenna at least twice within a single period of constant frequency.

9. The apparatus of claim 7 further comprising a further antenna arranged to continuously receive the data signal and a further receive chain connected to the further antenna arranged to detect a data code within the data signal indicative of the beginning of a period of constant frequency and arranged to provide a control signal to the signal switch to commence connecting the plurality of antennas to the first receive chain.

10. The apparatus of claim 9, wherein the further antenna comprises one of said plurality of antennas.

11. The apparatus of claim 9, wherein the further receive chain comprises said signal receive chain.

12. The apparatus of claim 7, wherein said antennas and receive chain are arranged to receive Bluetooth™ radio signals.

13. A mobile device including the apparatus of claim 7.

* * * * *

UNITED STATES PATENT AND TRADEMARK OFFICE
CERTIFICATE OF CORRECTION

PATENT NO.         : 8,150,354 B2
APPLICATION NO.    : 12/558019
DATED              : April 3, 2012
INVENTOR(S)        : Newton et al.

Page 1 of 1

It is certified that error appears in the above-identified patent and that said Letters Patent is hereby corrected as shown below:

In the Specifications

In Column 1, Line 41, delete "feasible To" and insert -- feasible to --, therefor.

In Column 1, Line 65, delete "values" and insert -- values. --, therefor.

In Column 1, Line 65, delete "Additionally," and insert -- Additionally --, therefor.

In the Claims

In Column 8, Line 14, in Claim 7, delete "Apparatus" and insert -- An apparatus --, therefor.

In Column 8, Line 37, in Claim 8, delete "claim 7" and insert -- claim 7, --, therefor.

In Column 9, Line 40, in Claim 9, delete "claim 7" and insert -- claim 7, --, therefor.

Signed and Sealed this
First Day of October, 2013

Teresa Stanek Rea
*Deputy Director of the United States Patent and Trademark Office*